US008775168B2

(12) United States Patent
Muralidhar et al.

(10) Patent No.: US 8,775,168 B2
(45) Date of Patent: Jul. 8, 2014

(54) YULE WALKER BASED LOW-COMPLEXITY VOICE ACTIVITY DETECTOR IN NOISE SUPPRESSION SYSTEMS

(75) Inventors: Karthik Muralidhar, Singapore (SG); Anoop Kumar Krishna, Singapore (SG)

(73) Assignee: STMicroelectronics Asia Pacific PTE, Ltd., Singapore (SG)

( * ) Notice: Subject to any disclaimer, the term of this patent is extended or adjusted under 35 U.S.C. 154(b) by 1850 days.

(21) Appl. No.: 11/890,268

(22) Filed: Aug. 3, 2007

(65) Prior Publication Data

US 2008/0040109 A1 Feb. 14, 2008

Related U.S. Application Data

(60) Provisional application No. 60/836,882, filed on Aug. 10, 2006.

(51) Int. Cl.
*G10L 25/00* (2013.01)
*G10L 21/00* (2013.01)
*G10L 21/02* (2013.01)
*G10L 15/00* (2013.01)

(52) U.S. Cl.
USPC ........... 704/214; 704/200; 704/201; 704/208; 704/210; 704/211; 704/215; 704/226; 704/227; 704/228; 704/233

(58) Field of Classification Search
CPC ......... G10L 15/02; G10L 25/00; G10L 25/03; G10L 25/06; G10L 25/27; G10L 25/45; G10L 25/48; G10L 25/51; G10L 25/08; G10L 25/84; G10L 25/87; G10L 25/93; G10L 2025/00; G10L 2025/78; G10L 2025/783; G10L 2025/786; G10L 2025/93; G10L 2025/935
USPC ......... 704/200, 201, 208, 210, 211, 214, 215, 704/226, 227, 228, 233
See application file for complete search history.

(56) References Cited

U.S. PATENT DOCUMENTS 4,015,088 A * 3/1977 Dubnowski et al. .......... 704/208
5,572,623 A * 11/1996 Pastor ........................... 704/233

(Continued)

FOREIGN PATENT DOCUMENTS

EP 0 335 521 A1 10/1989
GB 2 367 466 A 4/2002

OTHER PUBLICATIONS

Alan Davis et al., "Statistical Voice Activity Detection Using Low-Variance Spectrum Estimation and an Adaptive Threshold," IEEE Transactions on Speech and Audio Processing, 2006, pp. 1-13.

(Continued)

*Primary Examiner* — Paras D Shah
(74) *Attorney, Agent, or Firm* — Munck Wilson Mandala, LLP

(57) ABSTRACT

A Yule-Walker based, low-complexity voice activity detector (VAD) is disclosed. An input signal is typically noisy speech (i.e., corrupted with, for example, babble noise). In one embodiment, a first initialization stage of the VAD computes an occurrence of a silent period within the input signal and the AR parameters. The VAD could accordingly compute a tentative adaptive threshold and output hypothesis $H_1$ (which means speech is present) during this stage. During the second initialization stage, the VAD generally builds a database of associated values and computes the adaptive threshold accordingly. The second initialization stage could also output tentative VAD decisions based on the tentative threshold computed in the first initialization stage. Finally, the VAD periodically retrains or updates AR parameters, threshold values and/or the database and outputs VAD decisions accordingly.

21 Claims, 4 Drawing Sheets

(56) References Cited

U.S. PATENT DOCUMENTS

| | | | | |
|---|---|---|---|---|
| 5,619,565 | A * | 4/1997 | Cesaro et al. | 379/386 |
| 5,774,849 | A * | 6/1998 | Benyassine et al. | 704/246 |
| 6,411,925 | B1 * | 6/2002 | Keiller | 704/200 |
| 6,694,010 | B1 * | 2/2004 | Verreault | 379/386 |
| 6,704,711 | B2 * | 3/2004 | Gustafsson et al. | 704/258 |
| 6,711,536 | B2 * | 3/2004 | Rees | 704/210 |
| 6,912,496 | B1 * | 6/2005 | Bhattacharya et al. | 704/228 |
| 7,031,916 | B2 * | 4/2006 | Li et al. | 704/233 |
| 7,043,428 | B2 * | 5/2006 | Li | 704/233 |
| 7,072,833 | B2 * | 7/2006 | Rajan | 704/233 |
| 7,277,853 | B1 * | 10/2007 | Bou-Ghazale et al. | 704/248 |
| 7,363,217 | B2 * | 4/2008 | Lu et al. | 704/219 |
| 7,761,294 | B2 * | 7/2010 | Kim | 704/233 |
| 2001/0034601 | A1 * | 10/2001 | Chujo et al. | 704/233 |
| 2002/0198704 | A1 | 12/2002 | Rajan et al. | |

OTHER PUBLICATIONS

Henning Puder, et al., "An Approach to an Optimized Voice-Activity Detector for Noisy Speech Signals", 11th European Conference on Signal Processing, vol. 1, Sep. 3-6, 2002, pp. 243-246.

European Search Report dated Dec. 8, 2008 in connection with European Patent Application No. EP 07 25 3153.

* cited by examiner

YULE WALKER BASED LOW-COMPLEXITY VOICE ACTIVITY DETECTOR IN NOISE SUPPRESSION SYSTEMS

CROSS-REFERENCE TO RELATED APPLICATION AND CLAIM OF PRIORITY

The present application is related to U.S. Provisional Patent No. 60/836,882, filed Aug. 10, 2006, entitled "YULE WALKER BASED LOW-COMPLEXITY VOICE ACTIVITY DETECTOR IN NOISE SUPPRESSION SYSTEMS". U.S. Provisional Patent No. 60/836,882 is assigned to the assignee of the present application and is hereby incorporated by reference into the present disclosure as if fully set forth herein. The present application hereby claims priority under 35 U.S.C. §119(e) to U.S. Provisional Patent No. 60/836,882.

TECHNICAL FIELD

The disclosure relates generally to VOIP, noise suppression and speech recognition systems, and in particular to voice activity detectors (VADs).

BACKGROUND

Speech signals are not continuous. Typically, in between words and sentences, there are silence periods which contain background noise only. Algorithms to identify these silence periods are called as voice-activity detection (VAD) algorithms and find important usage in speech application algorithms. VADs are generally used in speech recognition systems, voice over Internet protocol (VoIP) systems, speech coders, noise suppression and/or enhancement systems, or any other suitable speech applications or algorithms.

VAD is becoming increasingly important and relevant in modern telecommunication and speech enhancement systems. Conventional voice-based communication typically use public switched telephone network (PSTN). Such systems are expensive when the distance between the calling and called subscriber is large because of dedicated connection.

Data networks, on the other hand, currently work on the best effort delivery techniques and resource sharing algorithms through statistical multiplexing. Therefore, the cost of such data services is considerably less relative to PSTN based services. Data networks, however, do not guarantee faithful voice transmission.

VoIP systems have to ensure that voice quality does not significantly deteriorate due to network conditions such as packet-loss and delays. Therefore, providing toll grade voice quality through VoIP is a challenge given that designers often prefer to lower the average bit-rate of speech communication systems. The VAD is used to selectively encode and transmit data. Apart from data savings, VAD also results in power savings in mobile devices and decreased co-channel interference in mobile telephony.

VAD is also used in non real-time systems such as voice recognition systems. VAD is generally critical for performance level demands associated with noise suppression systems. In addition, because VAD based systems need only operate when speech is present, the complexity of noise suppression systems is generally reduced.

Some conventional approaches include relatively robust applications of VAD for discontinuous transmission (DTX) operation of speech coders such as, for example, IS-641, GSM-FR and GSM-EFR based systems. In addition, DTX operation can be essential for longer battery life.

Conventional VAD algorithms are typically based on heuristics or fuzzy rules and, in some cases, general speech properties. Such design methodologies makes it difficult to optimize relevant parameters and obtain consistent results. Conventional attempts have been made to develop a statistical model based VAD using, for example, a likelihood-ratio test (LRT). Other conventional algorithms suggest using a smoothed LRT or algorithms based on Kullback-Leibler distance. Still other conventional models use statistical methods that compare second order statistics of the signals to models.

Most conventional VAD detection is performed on a block by block basis. Generally, the block size is chosen such that speech is considered stationary. Speech is generally stationary for about 10 ms-20 ms. As an example, for a sampling rate of 8 KHz, the block size would be 160 (20 ms). Noise is considered to be stationary over a longer period, typically 1 s-2 s. For a given block, a statistic ($\Lambda$) is typically derived. Based on the statistic ($\Lambda$), conventional algorithms could assess whether speech is present.

Consider two hypotheses $H_1$ and $H_0$. $H_1$ is when speech present, while $H_0$ represents when speech absent. The relative relationship between $H_1$ and $H_0$ is shown by Equations 1a and 1b below.

$$H_1: x_k(n) = s_k(n) + n_k(n) \quad n = 0 \ldots N-1 \qquad \text{(Eqn. 1a)}$$

$$H_0: x_k(n) = n_k(n) \quad n = 0 \ldots N-1 \qquad \text{(Eqn. 1b)}$$

In Equations 1a and 1b, $x_k(n)$ is the observed signal in block k at time instant n. Also, in Equations 1a and 1b, N is the observation length, $s_k(n)$ is the speech and $n_k(n)$ is the background noise.

The background noise, $n_k(n)$, is generally a colored noise process. Deciding the hypothesis $H_1$ or $H_0$ is a generally a problem in detection theory. The detection criterion shown by Equations 2a and 2b below are typically used.

$$H_1: \Lambda > T \qquad \text{(Eqn. 2a)}$$

$$H_0: \Lambda < T \qquad \text{(Eqn. 2b)}$$

In Equations 2a and 2b, T is generally a threshold.

FIG. 1 generally illustrates the relationship between clean speech 100*a*, noisy speech 100*b* and the VAD output. In FIG. 1, the VAD outputs a '1' ($H_1$) when speech is present (e.g., points 102 and 104) and a '0' ($H_0$) when speech is absent (e.g., point 106).

The probability of detection ($P_D$) is generally the probability of detecting speech ($H_1$), given that speech is present (i.e., condition $H_1$ is true). The probability of a false alarm ($P_F$) is generally the probability of detecting speech ($H_1$) when speech is absent (i.e., condition $H_0$ is true).

Accordingly, $P_D$ and $P_F$ depend upon noise as well as speech statistics. However, in some cases only noise statistics are considered. In such cases, the system is typically designed for a given false alarm $P_F$ and hence there is no control over $P_D$.

Other conventional methods are based on the principle that the expected value of periodogram is equal to the power spectral density (psd). The periodogram is typically the square of the absolute value of Fourier fast transform (FFT). The psd depends on the statistics of the randomness of the signal. If the periodogram of many blocks of the signal are averaged, periodogram tends to be equal to the psd.

The decision statistic is typically given by the relationship seen in Equation 3 below.

$$\Lambda_k = \sum_l \psi_k(f_l) \quad \text{(Eqn. 3)}$$

In Equation 3, the term $\psi_k(f_l)$ is the decision statistic for frequency bin $f_l$ and block k and is defined by the relationship shown by Equation 4 below.

$$\psi_k(f_l) = \frac{pgm_k(f_l)}{psd(f_l)} - 1 \quad \text{(Eqn. 4)}$$

In Equation 4, $pgm_k(f_l)$ is the periodogram of the $f_l$ frequency bin obtained on the $k^{th}$ block of observed samples. Also in Equation 4, $psd(f_l)$ is the psd estimate of the $f_l$ frequency bin of the background noise. The term $psd(f_l)$ is obtained over the silence periods present in the training period at the beginning of the phone call (when, invariably, only noise is present). Accordingly, the relationships shown in Equations 5 and 6 below can be made, where k (and the summation) corresponds to noise blocks.

$$\sum_k \psi_k(f_l) \approx 0 \quad \text{(Eqn. 5)}$$

$$\sum_k \Lambda_k \approx 0 \quad \text{(Eqn. 6)}$$

The decision statistic is 0 if averaged over many blocks containing only noise (Hypothesis $H_0$). Over each noise block, it is assumed to take low values. In the presence of speech, the decision statistic has a variable value and generally greater than those obtained when speech is absent (noise blocks). There is, however, an overlap of these values. The statistic is based on background noise only and no speech information is used. Hence, the design or threshold can only be chosen for a given false alarm.

There is therefore a need for improved voice activity detection (VAD) in noise suppression systems.

SUMMARY

Embodiments of the present disclosure generally provide systems and methods for voice activity detection (VAD) in, for example, noise suppression systems and VOIP systems. In particular, one embodiment of the present disclosure provides a Yule-Walker based low-complexity VAD.

In one embodiment, the present disclosure provides a method of detecting voice activity from an input signal having a silent period and a speech period. The method includes determining an occurrence of an initial silent period, computing an autoregressive (AR) parameter from the initial silent period. The method could also include storing information associated with the silent and speech periods in a database. The method could further include outputting a decision value based on at least one of: the AR parameter, the threshold and the database.

In another embodiment, the present disclosure provides a voice activity detector (VAD). The VAD could include an input to receive a signal having an initial silent period. The VAD could also include a first circuit to compute an autoregressive (AR) parameter from the initial silent period. The VAD could further include a memory to store a database of information associated with the silent period. In addition, the VAD could also include a second circuit to output a modified version of the input signal based on at least one of: the AR parameter and the database.

In yet another embodiment, the present disclosure provides a method of using a voice activity detector. The method could include receiving an input signal having an initial silent period. The method could also include computing an autoregressive (AR) parameter from the initial silent period using a Yule-Walker relationship. The method could further include storing information associated with the silent period in a database and computing an adaptive threshold using at least one of: the AR parameters and the database. The method could still further include outputting a modified version of the input signal based on at least one of: the AR parameter, the adaptive threshold and the database.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
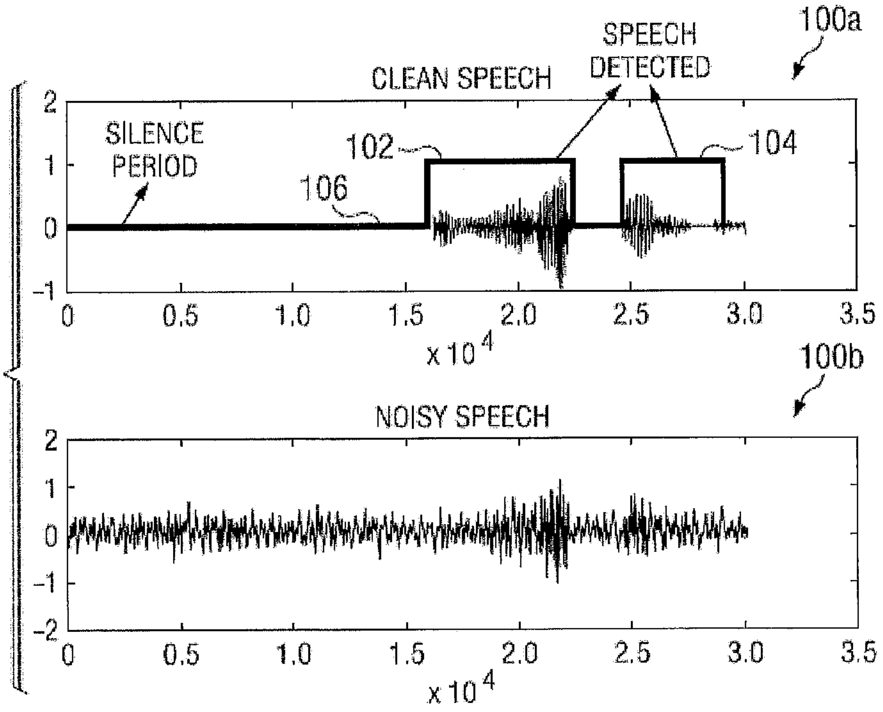
FIG. 1 generally illustrates the relationship between clean speech, noisy speech and VAD output according to one embodiment of the present disclosure.

Embodiments of the present disclosure generally provide systems and methods for voice activity detection (VAD) in, for example, noise suppression systems and VOIP systems. It should be understood, however, that embodiments of the present disclosure could also be used in a variety of other applications such as, for example, speech recognition systems, voice over Internet protocol (VoIP) systems, speech coders, noise enhancement systems, and/or any other suitable speech applications or algorithms.

Suppose a signal y(n) is given by the relationship shown in Equation 7 below.

$$y(n) = \sum_{i=1}^{p} a(i)y(n-i) + w(n) \quad \text{(Eqn. 7)}$$

In Equation 7, y(n) is called as autoregressive (AR) process of order p. The AR process of order p is driven by additive white Gaussian noise (AWGN) (designated in Equation 7 as w(n)) and passed through an infinite impulse response (IIR) filter with coefficients a(i). The coefficients a(i) are called the AR coefficients of the process.

The autocorrelation function (ACF) of y(n) is $$r_y^b(m) = \frac{1}{N}\sum_{i=0}^{N-m-1} y(i+m)y(i) \quad \text{Eqn (8a)}$$

$$r_y^u(m) = \frac{1}{N-m}\sum_{i=0}^{N-m-1} y(i+m)y(i) \quad \text{Eqn (8b)}$$

The ACF can be biased $r_y^b$ or unbiased $r_y^u$. If the ACF is biased, the average of the value over many realizations differs from the true value. If the ACF is unbiased, the average over many realizations is equal to the true value. For the purposes of the present disclosure, it is assumed that the ACF is unbiased and the superscript "u" will be dropped from the notation.

The AR coefficients and ACFs are related as shown in Equations 9 and 10 below.

$$Ra = r \quad \text{(Eqn. 9)}$$

$$R = \begin{bmatrix} r_y(1) & r_y(2) & \dots & r_y(p) \\ r_y(2) & r_y(1) & \dots & r_y(p-1) \\ \vdots & \vdots & \ddots & \\ r_y(p) & \dots & r_y(2) & r_y(1) \end{bmatrix} \quad \text{(Eqn. 10)}$$

$$a_n = \begin{bmatrix} a(1) \\ a(2) \\ \vdots \\ a(p) \end{bmatrix} \quad r = \begin{bmatrix} r_y(2) \\ r_y(3) \\ \vdots \\ r_y(p) \end{bmatrix}$$

The relationships shown in Equations 9 and 10 are generally referred to as the Yule-Walker equations.

Low-Complexity VAD

In one embodiment, the relationships shown in the Yule-Walker equations are used to provide a low-complexity voice activity detector in, for example, noise suppression systems.

Assuming that sufficient blocks are available in the silence periods and are invariably present during a speech call, the AR parameters of noise, $a_n$, can be estimated from those silence periods. Consider the statistic for the kth block (and assuming that $H_0$ is the actual hypothesis or when speech is absent).

The statistic for the kth block is shown by Equation 11a below.

$$\Lambda_k(H_0)=Ra_n-r \quad \text{(Eqn. 11a)}$$

The correlation matrices R and r are calculated on a block by block basis.

If $\Lambda k(H_0)$ is averaged over many blocks, it should be equal to 0, similar to what is shown in Equation 6 above. The statistic itself has a low value, a low variance and a zero mean. However, in the presence of speech (Hypothesis $H_1$), the statistic could be shown as Equation 11b below.

$$\Lambda_k(H_1)=Ra_n-r \quad \text{(Eqn. 11b)}$$

However, using a modified statistic (which is a positive scalar in Equation 12 below), the presence or absence of speech could be detected.

$$\psi_k=[Ra_n-r]^T[Ra_n-r] \quad \text{(Eqn. 12)}$$

The new statistic generally exhibits a low value in silence periods and a variable value in the presence of speech. When the histograms of the statistic are plotted under both hypotheses, there is relatively little overlap between the two histograms as shown later herein.

Hence, according to one embodiment, an appropriate threshold could be used to detect the presence or absence of speech as shown by the relationship found in Equations 13a and 13b.

$$H_1:\psi_k>T \quad \text{(Eqn. 13a)}$$

$$H_0:\psi_k<T \quad \text{(Eqn. 13b)}$$

Control Logic Method

For the implementation of VAD, there are many associated control logic operations such as, for example, adaptive thresholds, AR parameter updates, hangover schemes and switching algorithms.

Adaptive thresholds are thresholds that need to be retrained periodically. Accordingly, an adaptive threshold computation unit typically updates the threshold regularly. In one embodiment, the threshold is determined based on a histogram of a database (as later described in detail herein). The threshold is determined when, for example, the following conditions are met: (1) at least one transition from $H_1$ to $H_0$; (2) at least one transition from $H_0$ to $H_1$, and/or the states involved in the transition have lasted for at least 30 blocks. After the computation of the new threshold, the entries in the database are deleted and it is populated afresh.

AR parameter updates occur frequently because AR parameters of the background noise needs to be updated frequently. In one embodiment, these updates are performed when silence periods of reasonable duration are detected such as, for example, a minimum of 30 blocks, and when the retraining flag is set. The retraining flag could be set once every 500 blocks.

Hangover schemes are usually present in VADs and in the present disclosure an implicit hangover scheme is based on the averaging of local maxima of the test statistic.

VADs generally need a silence period to train. Most VAD algorithms assume that the input speech signals start with a silence period that could be used for training purposes. In some cases, however, there could be some input signals which start with speech and not with a silence period. In these cases, an initialization block, which typically determines the first occurrence of silence period, learns the AR parameters during the silence period and then switches to the actual algorithm as generally shown in FIG. 2.

Figure 2:
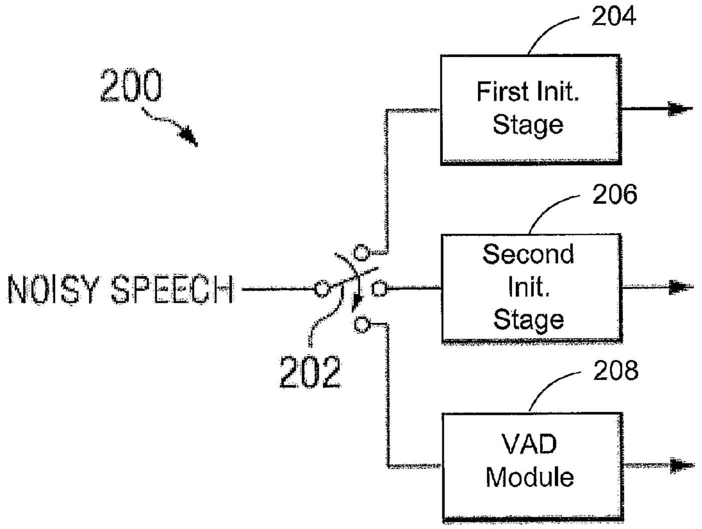
FIG. 2 is a somewhat simplified illustration of the architecture of a voice activity detector (VAD) according to one embodiment of the present disclosure.

FIG. 2 is a somewhat simplified illustration of the architecture of a VAD 200 according to one embodiment of the present disclosure. The embodiment of VAD 200 shown in FIG. 2 is for illustration only. Other embodiments of VAD 200 may be used without departing from the scope of this disclosure.

In one embodiment, VAD 200 includes switch 202 that selectively couples incoming noisy speech to one of a first initialization stage 204 (first circuit), a second initialization state 206 (second circuit) and an actual VAD module 208 (third circuit).

According to one embodiment, first initialization stage 204 generally computes the occurrence and duration of silence period, AR parameters, and a tentative threshold. First initialization stage 204 outputs hypothesis $H_1$ as described herein.

According to one embodiment, second initialization stage 206 generally builds a database of the test statistic and computes an initial value of the adaptive threshold. Second initialization stage 206 could also output tentative VAD decisions as described herein based on the tentative threshold computed in the first initialization stage (first circuit).

According to one embodiment, actual VAD module 208 periodically retrains or updates AR parameters, threshold values and/or the database. Actual VAD module 208 outputs VAD decisions as described herein.

Adaptive Threshold Method

In one embodiment, the present disclosure provides a method to choose the threshold adaptively. This method is based on tracking the envelope of the test statistic $\psi_i$ with time.

Suppose the test statistic for block i is denoted by $\psi_i$. In one embodiment, at each time instant i (block i), it is determined whether the test statistic is a local maxima or not. If it is a local maxima, the test statistic value is updated. If it is not, the previous local maxima value is retained. In one embodiment, this instantaneous local maxima is averaged (or smoothed) over a few blocks.

Based on the above processing, the smoothed local maxima is concentrated as two clusters. For example, one cluster could be for speech and the other for noise. The adaptive threshold chooses a threshold in between these clusters by computing a histogram of the logarithm of the smoothed local maxima test statistic. The histogram is updated once speech and noise regions (at least one each) of length greater than 30 blocks each are detected. The histogram relies on a database (db) of smoothed local maxima computed every block.

The following terms/definitions are generally used in the pseudocode shown herein below. The term lm(i) represents the local maxima for block i and is the updated value or the previous value held. The term slm(i) is generally the smoothed local maxima. The term db generally represents the database of $\log_{10}$(slm(.)). The term th(i) generally represents the value of the threshold for block i where the initialization is done as per the second initialization stage of the switching algorithm described later herein. Finally, the term NBLKS refers to the smoothing length/averaging length.

The VAD decision ('0' for hypothesis $H_0$ and '1' for $H_1$) is based on the logarithm of the smoothed local maxima of the test statistic $$\text{Output } VAD \text{ decision '1' or } H_1: \log_{10}(slm(i)) > T$$

$$\text{Output } VAD \text{ decision '0' or } H_0: \log_{10}(slm(i)) < T$$

where T is the adaptive threshold

The steps or pseudo code for one embodiment of the adaptive threshold method described above is given below. The pseudo code is for illustration purposes only it should be understood that other suitable pseudo code could be used in conjunction with or in lieu of the given pseudo code. The pseudo code could be implemented, for example, on any suitable computer program embodied on a computer readable medium.

```
WHILE(speech block is present)
  IF i == 1
    lm(1) = ψ_i /*initialization*/
  ENDIF
  IF i > 3
    IF ψ_{i-1} is a local maxima
      lm(i-1) = ψ_{i-1}
    ELSE
      lm(i-1) = lm(i-2) /*hold the previous
value*/
    ENDIF
  ENDIF
  /*do smoothing*/
  IF i > NBLKS
    slm(i-1) = average of lm(i-1), .., lm(i - NBLK)
    ADD log10(slm(i-1)) to db
    IF (This is a silence region lasted for more than
30 blocks and retrain flag is set)
      LEARN and RETRAIN AR parameters over the
silence period
    ENDIF
    COMPUTE VAD decision based on threshold
    IF (at least one speech and one noise region,
each with 30 or more blocks, have been detected)
      DETERMINE threshold based on histogram of db
      DELETE all entries of db
    ENDIF
  ENDIF
ENDWHILE
```

In one embodiment, the correlations of input signal (R and r in Eq (9)) are stored during each block. Once the silent period is detected, the correlation matrices (R and r in Eq (9)) for all the blocks in the silent period are added and the AR parameters are computed based on Yule Walker equations as shown in Eqn (9). If all the AR parameters so determined are less than 0.1, a value '1' is assigned to all the AR parameters.

In one embodiment, the present disclosure provides a procedure to determine the adaptive threshold based on a histogram of database (denoted by db henceforth) where the following notation could be used:

$$[\text{count range}] = \text{hist}(db, n\text{bins})$$

In the above notation for the histogram, "nbins" is number of equi-spaced bins between maximum and minimum values of db, "range" is an array whose elements are the midpoints of the bins and "count" is an array whose elements denote the number of occurrences of the elements of db in each bin.

Now, suppose that the bin "locf" refers to the location of the first local maxima in the histogram, bin "locb" refers to the location of the last local maxima in the histogram and "minl" refers to the bin corresponding to the minimum count value in the histogram and located between bins locf and locb.

The threshold is then given by the following relationship where the threshold is given in log 10.

$$\text{threshold} = \log_{10}(\text{min}l)$$

Then, the following relationship could result for the histogram with 3 bins:

$$[\text{count3range3}] = \text{hist}(db, 3)$$

In one embodiment, upper and lower clipping is applied to the threshold based on count3 and range3. Suppose further that the following pseudo code is used to apply the upper and lower clipping as described above.

```
UL: (range3(2)+range3(3))/2
LL: (range3(2)+range3(1))/2
/*range3(2) denotes second element of array range3 and so
on*/
```

-continued

```
IF threshold > UL
  threshold = UL
ELSEIF threshold < LL
  threshold = LL
ENDIF
```

The pseudo code given above is for illustration purposes only. It should be understood that other suitable pseudo code could be used in conjunction with or in lieu of the given pseudo code. The pseudo code could be implemented on any suitable computer program embodied on, for example, a computer readable medium. The resulting plots corresponding to the above discussion are given in FIGS. 5 and 6.

Figure 5:
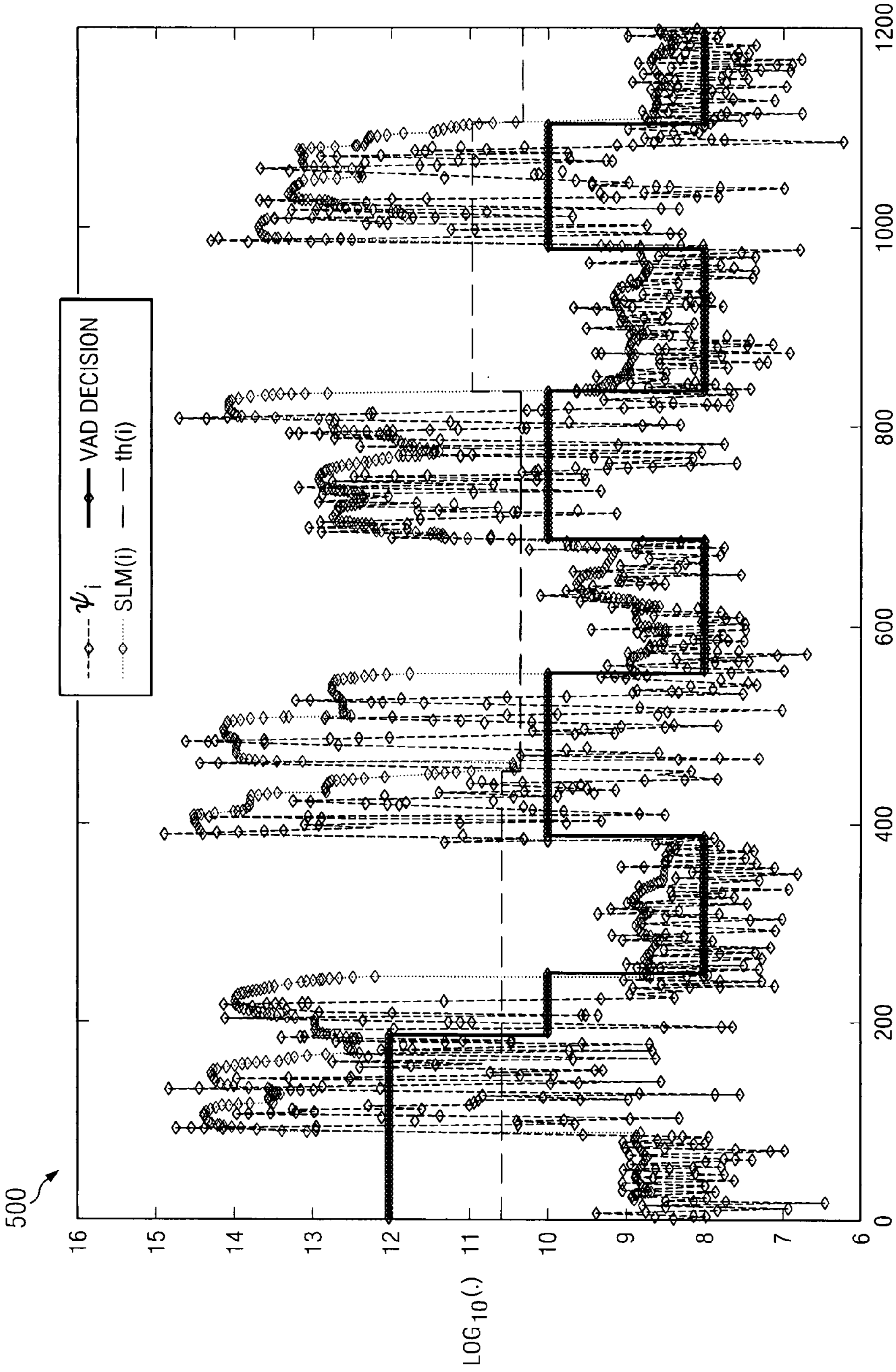
FIG. 5 is a graph illustrating the adaptive threshold and local maxima of a test statistic according to one embodiment of the present disclosure.

FIG. 5 is a generally a graph 500 illustrating the adaptive threshold and local maxima of a test statistic according to one embodiment of the present disclosure. For illustration purposes VAD decision of '12' and '10' are used in lieu of '1' and '8' is used in lieu of '0'. Note that in FIG. 5 threshold gets updated around blocks 453 and 800.

Figure 6:
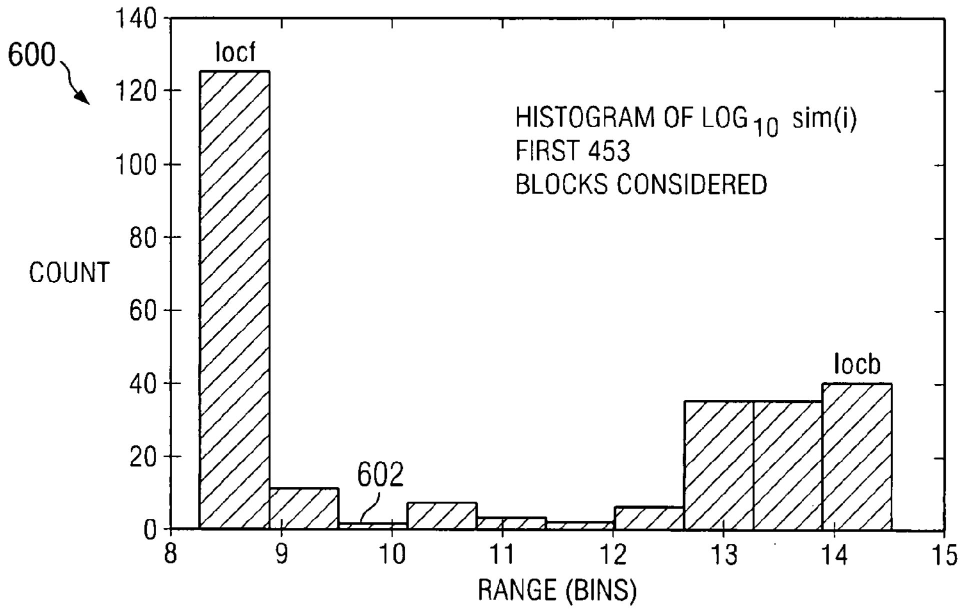
FIG. 6 is a graph illustrating a histogram for the adaptive threshold according to one embodiment of the present disclosure.

FIG. 6, on the other hand, is a graph 600 illustrating a histogram for the adaptive threshold according to one embodiment of the present disclosure.

Switching

The VAD algorithm described herein is generally based on the assumption that there is an initial period of silence when it is possible to learn the noise AR parameters. However, there are some G.729 test vectors which start with speech and do not have any silence period to begin with. The algorithms fail in that scenario. To overcome this problem a switching method is proposed.

Initially, a crude VAD based on forward prediction error (FPE) or an energy detector (ED) is used until we determine a sizeable silence period. We then train our algorithm during that silence period to determine the AR parameters. A tentative threshold based on standard deviation and mean of the FPE is also formed at this stage.

The crude VAD or the initialization is again repeated (second circuit). However, during this repetition we output tentative VAD decisions based on the tentative threshold calculated earlier and we also build up the histogram of the database to calculate the initial value of the adaptive threshold which will be used once we switch to the actual VAD (third circuit). The repetition of the crude VAD is done mainly to reduce the MIPS involved in building up the database and calculating the initial value of the adaptive threshold.

The initialization, therefore, has two stages. The pseudocode is given below

```
maxval: maximum of sd(0), sd(1),..., sd(i)
maxloc: location of maxval
minval: minimum of sd(0), sd(1),..., sd(i)
minloc: location of minval
SECOND_STAGE_INITIALISATION = FALSE
INITIALISATION = TRUE
WHILE (INITIALISATION == TRUE)
  e(i) = fpe of current block of speech
  sd(i) = standard deviation of e(i), .., e(i−NBLK+1)
  md(i) = mean of e(i), .., e(i−NBLK+1)
  compute maxval, maxloc, minval and minloc
  compute ratio = maxval/minval
  IF (sd(i) == minval)
    tmp = 3*sd(i)+md(i)
    /*tentative threshold is tmp*/
  ENDIF
  IF (SECOND_STAGE_INITIALISATION ==TRUE)
    BUILD db
    OUTPUT VAD decisions based on tentative threshold
```

-continued

```
  ENDIF
  IF(ratio > 100) AND (SECOND_STAGE_INITIALISATION ==
FALSE)
    silence period is from minloc−NBLK+1 to minloc
    COMPUTE AR parameters over the silence period
    RESET maxval, maxloc, minval, minloc and ratio
    tentative threshold = tmp
    SECOND_STAGE_INITIALISATION = TRUE
  ENDIF
  IF(ratio > 100) AND (SECOND_STAGE_INITIALISATION ==
TRUE)
    COMPUTE threshold from db
    DELETE all entries in db
    INITIALISATION = FALSE
  ENDIF
```

The pseudo code given above is for illustration purposes only. It should be understood that other suitable pseudo code could be used in conjunction with or in lieu of the given pseudo code. The pseudo code could be implemented on any suitable computer program embodied on a computer readable medium.

Embodiments of the present disclosure were tested for a total of 62 test vectors. The various classes of test vectors (classified according to the background noise) are "Bureau" (office)
"can" (Babble noise)
"gare" (train station)
"rue" (street noise)
"train" (inside a train)

About 18 babble test vectors, 13 IEEE test vector, 12 AMR test vectors and 5 G729 test vectors were considered. There were car noises and clean test vectors as well.

Figure 3:
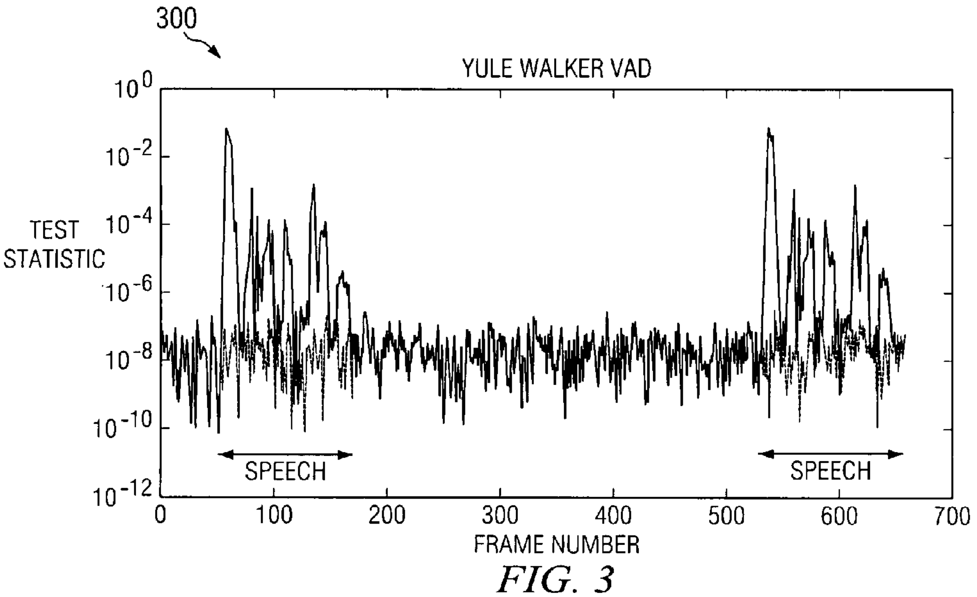
FIG. 3 is graph illustrating the test statistic of under both hypotheses according to one embodiment of the present disclosure.

FIG. 3 is a plot 300 of test statistic (i.e., the y-axis) over time (designated as frame number on the x-axis) under both hypotheses, $H_o$ and $H_1$ according to one embodiment of the present disclosure. Plot 300 shown in FIG. 3 is for illustration only. Other embodiments of plot 300 may be apparent without departing from the scope of this disclosure.

Under $H_0$ (approximately between frames 200 and 500) noise only is present, while under $H_1$ (approximately between frames 50-150 and frames 525-675) both speech and noise are present. Accordingly, there is a clear distinction (or rise) in the test statistic when speech is present.

Figure 4:
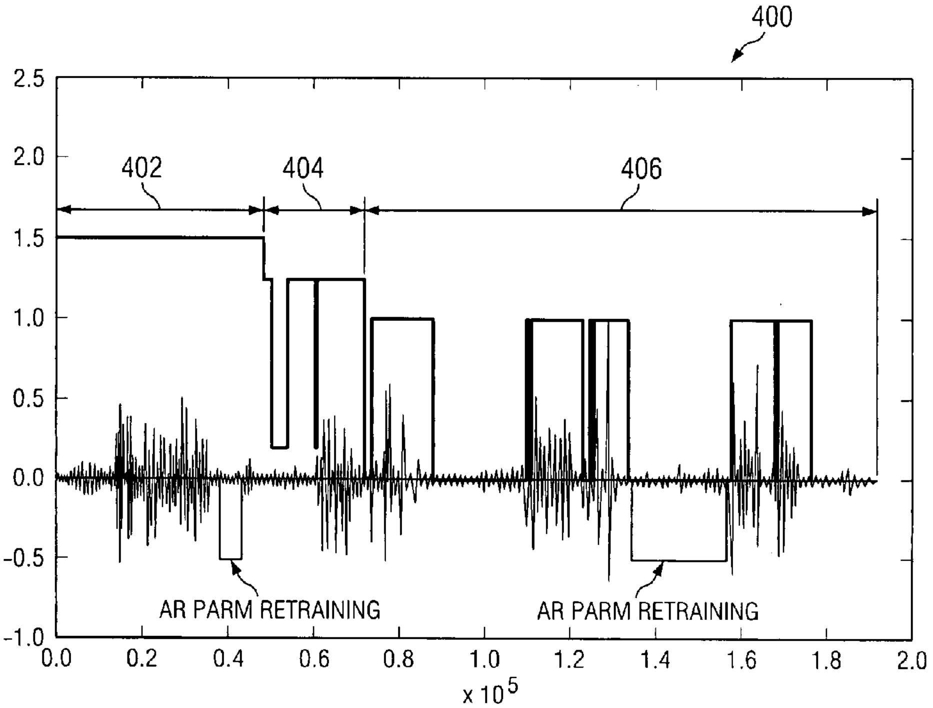
FIG. 4 is a graph illustrating the various VAD stages and associated VAD decisions in each stage according to one embodiment of the present disclosure.

FIG. 4 is plot 400 illustrating the various VAD stages (first, second and third circuits) and associated VAD decisions in each stage according to one embodiment of the present disclosure. Plot 400 shown in FIG. 4 is for illustration only. Other embodiments of plot 400 may be apparent without departing from the scope of this disclosure. For clarity, the value of VAD decisions in each stage is different.

The input signal is a noisy speech (i.e., corrupted with, for example, babble noise). During the first stage of initialization 402 (first circuit), the VAD outputs $H_1$, determines the occurrence/duration of silence period and computes the AR parameters and tentative threshold. During the second stage of the initialization 404, VAD outputs tentative decisions based on the tentative threshold computed in the first stage. After that, the actual VAD stage 406 comes into operation. AR parameter retraining occurs in both the first stage of initialization 402 and during the actual VAD 406.

FIG. 5 is plot 500 illustrating the adaptive threshold and local maxima of a test statistic according to one embodiment of the present disclosure. This occurs in the third circuit or when the actual VAD is in operation. Plot 500 shown in FIG. 5 is for illustration only. Other embodiments of plot 500 may be apparent without departing from the scope of this disclosure.

From FIG. 5, it can be observed that the smoothed local maxima statistic slm(i) based on envelope detection separates the test statistic in to two clusters. The adaptive threshold can be easily obtained from histogram if it is based on $\log_{10}$(slm (i)) rather than $\log_{10}(\psi_i)$, as seen in FIG. 5.

In particular, the sharp fall/rise in $\log_{10}$(slm(i)) is evident when there is a transition from speech/noise to noise/speech regions. In FIG. 5, the threshold is updated after the first 453 blocks and 800 blocks.

FIG. 6 is a graph illustrating a histogram for the adaptive threshold for the first 453 blocks shown in FIG. 5 according to one embodiment of the present disclosure. Plot 600 shown in FIG. 6 is for illustration only. Other embodiments of plot 600 may be apparent without departing from the scope of this disclosure.

In FIG. 6, there are generally two peaks, each corresponding to noise and speech region. The adaptive threshold 602 corresponds to the bin (plotted along the x-axis) whose count value (plotted along the y-axis) is minimum and located between these two peaks. In this case threshold 602 is chosen as a value close to 10 and is also shown in FIG. 5.

Complexity

All samples are wideband samples meaning we have 16000 samples per second. For a typical block length of 320, there are about 50 blocks per second. In one embodiment, the present disclosure provides an algorithm that requires only four correlations. For the reference algorithm, each block is subdivided into a set of overlapping smaller blocks.

For the algorithm from the prior art and based on periodogram (Eqn (4)), each block of length 320 is subdivided in to smaller blocks of length 32. There is 50% overlap which means we have 20 sub blocks. Each subblock is windowed by a Hanning window before psd is calculated. The psd is averaged over the 20 sub blocks.

The complexity in terms of MIPS for the two algorithms is given below.

TABLE 1

Complexity of algorithms

| Algorithm | Complexity (Operation for 1 second of data) |
|---|---|
| One Embodiment of the Present Disclosure | 128000 |
| Reference | 476800 |

In one embodiment, the present disclosure provides an algorithm that has about 27% the complexity of the reference algorithm. If multiply and accumulate (MAC) instructions are used, the complexity of some embodiments is further reduced by half. But this is not the case for the reference algorithm.

Figure 7:
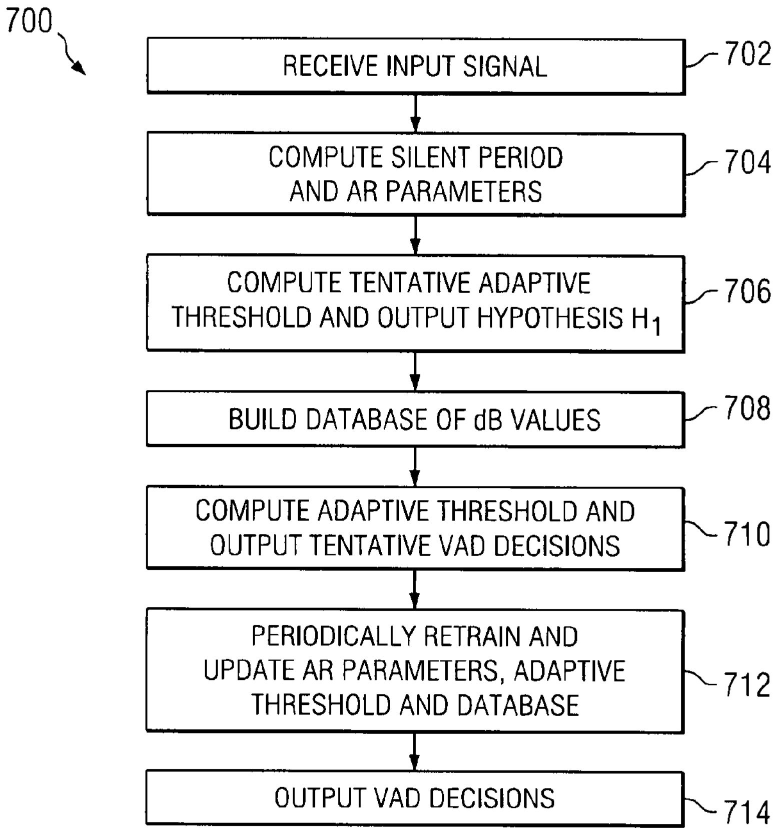
FIG. 7 is a somewhat simplified flow diagram illustrating a method according to one embodiment of the present disclosure.

FIG. 7 is a somewhat simplified flow diagram illustrating method 700 according to one embodiment of the present disclosure. Method 700 shown in FIG. 7 is for illustration only. Other embodiments of method 700 may be used without departing from the scope of this disclosure.

In one embodiment, method 700 generally provides a method for VAD using Yule-Walker relationships as described herein. In step 702, an input signal is received by the VAD such as, for example, VAD 200. The input signal is typically noisy speech (i.e., corrupted with, for example, babble noise).

In step 704, the VAD computes the first occurrence of a silent period of the input signal and the AR parameters. In step 706, the VAD accordingly computes a tentative adaptive threshold and outputs hypothesis $H_1$. Steps 704 and 706 correspond to the first circuit or the first initialization stage in 200.

In step 708, the VAD builds a database of dB values based on the computed test statistic. In step 710, the VAD computes an initial value of the adaptive threshold (to be used in actual VAD 208 or 712 and 714) and outputs tentative VAD decisions. Steps 708 and 710 correspond to the second circuit or second stage of initialization in 200. In step 712, the VAD periodically retrains or updates the AR parameters, the threshold values and/or the database.

Finally, in step 714, the VAD outputs VAD decisions according to the retrained and/or updated AR parameters, threshold values and/or the databases. Method 700 could repeat any step or combination of steps as necessary.

Accordingly, embodiments of the present disclosure generally provide systems and methods of noise suppression using a low-complexity, Yule-Walker based VAD that achieve relatively good and acceptable performances.

In some embodiments, various functions described above are implemented or supported by a computer program that is formed from a computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of detecting voice activity from an input signal having an initial silent period and a speech period, the method comprising:

determining occurrence of the initial silent period;

computing an autoregressive (AR) parameter from the initial silent period;

storing a test statistic of the input signal calculated during both the initial silent and speech periods in a database, wherein the test statistic is calculated from a product of the AR parameter adjusted by an autocorrelation function with a transpose of the AR parameter adjusted by the autocorrelation function;

computing a threshold from the database based on one or more values of the test statistic during the initial silent period and one or more values of the test statistic during the speech period; and outputting a decision value based on the AR parameter and the threshold.

2. The method of claim 1, wherein computing the AR parameter further comprises using a Yule-Walker relationship.

3. The method of claim 1, wherein computing the threshold further comprises computing an adaptive threshold using at least one of: the AR parameters and the database.

4. The method of claim 3, further comprising:

periodically updating at least one of: the AR parameter, the adaptive threshold value and the database.

5. The method of claim 3, further comprising:

periodically updating the adaptive threshold value at least once between one of two silent periods separated by a speech period and two speech periods separated by a silent period.

6. The method of claim 3, wherein outputting the decision value further comprises outputting the decision value based on the adaptive threshold.

7. The method of claim 1, wherein the test statistic $\Psi_k$ is calculated using:

$$\Psi_k=[Ra_n-r]^T[Ra_n-r]$$

where R is an AR correlation matrix, $a_n$ are coefficients of an infinite impulse response (IIR) filter, and r is and autocorrelation function (ACF) correlation matrix.

8. The method of claim 1, further comprising:

computing a tentative adaptive threshold from the initial silent period.

9. The method of claim 1, further comprising:

periodically updating the AR parameter when a second silent period has a duration greater than or equal to 30 blocks.

10. The method of claim 1, wherein the database comprises a logarithm of a smoothed local maxima of a test statistic of the input signal computed on a block by block basis.

11. A voice activity detector (VAD), comprising:

an input configured to receive a signal having an initial silent period and a speech period;

a first circuit configured to determine occurrence of the initial silent period, compute an autoregressive (AR) parameter from the initial silent period, and compute a threshold based on one or more values of a test statistic during the initial silent period and one or more values of the test statistic during the speech period, wherein the test statistic is calculated from a product of the AR parameter adjusted by an autocorrelation function with a transpose of the AR parameter adjusted by an autocorrelation function;

a memory configured to store a database of a test statistic of the input signal calculated during both the silent and speech periods; and a second circuit configured to output a decision value based on the AR parameter the threshold calculated in the first circuit.

12. The VAD of claim 11, wherein the first circuit is configured to compute the AR parameter using a Yule-Walker relationship.

13. The VAD of claim 11, wherein the second circuit is configured to compute an adaptive threshold using at least one of: the AR parameters and the database.

14. The VAD of claim 13, further comprising a third circuit configured to output a decision value based on at least one of: the AR parameter, the threshold and the database.

15. The VAD of claim 13, wherein the second circuit is configured to build the database of the test statistic of the input signal.

16. The VAD of claim 15, wherein the test statistic $\Psi_k$ is computed using:

$$\Psi_k=[Ra_n-r]^T[Ra_n-r]$$

where R is an AR correlation matrix, $a_n$ are coefficients of an infinite impulse response (IIR) filter, and r is and autocorrelation function (ACF) correlation matrix.

17. The VAD of claim 13, further comprising a third circuit configured to periodically update the adaptive threshold value at least once between one of two silent periods separated by a speech period and two speech periods separated by a silent period.

18. The VAD of claim 11, wherein the first circuit is configured to compute a tentative adaptive threshold from the silent period.

19. The VAD of claim 11, further comprising a third circuit configured to periodically update the AR parameter when a second silent period has a duration greater than or equal to 30 blocks.

20. A method of using a voice activity detector (VAD), the method comprising:

receiving an input signal having an initial silent period and a speech period;

computing an autoregressive (AR) parameter from the initial silent period using a Yule-Walker relationship;

storing a test statistic of the input signal calculated during both the initial silent period and the speech period in a database;

computing an adaptive threshold based on one or more values of the test statistic during the silent period and one or more values of the test statistic during the speech period wherein the test statistic is calculated from a product of the AR parameter adjusted by an autocorrelation function with a transpose of the AR parameter adjusted by an autocorrelation function; and outputting a decision value based on the AR parameter and the adaptive threshold.

21. The method of claim 19, further comprising:

periodically updating at least one of: the AR parameter, the adaptive threshold value and the database.

* * * * *

UNITED STATES PATENT AND TRADEMARK OFFICE

CERTIFICATE OF CORRECTION

PATENT NO. : 8,775,168 B2
APPLICATION NO. : 11/890268
DATED : July 8, 2014
INVENTOR(S) : Muralidhar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1980 days.

Signed and Sealed this
Tenth Day of November, 2015

Michelle K. Lee
*Director of the United States Patent and Trademark Office*